US008768018B2

(12) United States Patent
Ishikawa et al.

(10) Patent No.: US 8,768,018 B2
(45) Date of Patent: Jul. 1, 2014

(54) INFORMATION PROCESSING APPARATUS, INFORMATION PROCESSING METHOD, AND STORAGE MEDIUM

(75) Inventors: Ryo Ishikawa, Kawasaki (JP); Kiyohide Satoh, Kawasaki (JP); Takaaki Endo, Urayasu (JP)

(73) Assignee: Canon Kabushiki Kaisha, Tokyo (JP)

( * ) Notice: Subject to any disclaimer, the term of this patent is extended or adjusted under 35 U.S.C. 154(b) by 157 days.

(21) Appl. No.: 12/959,033

(22) Filed: Dec. 2, 2010

(65) Prior Publication Data

US 2011/0142308 A1 Jun. 16, 2011

(30) Foreign Application Priority Data

Dec. 10, 2009 (JP) .................................. 2009-281001

(51) Int. Cl.
*G06K 9/00* (2006.01)

(52) U.S. Cl.
USPC ........... 382/128; 382/129; 382/130; 382/131; 382/132; 382/190; 382/203; 382/278; 382/287; 382/288; 382/289; 382/293; 382/294; 382/298; 600/407; 600/410

(58) Field of Classification Search
USPC ........................................................ 382/128
See application file for complete search history.

(56) References Cited

U.S. PATENT DOCUMENTS

| | | | | |
|---|---|---|---|---|
| 5,590,653 A | * | 1/1997 | Aida et al. | 600/411 |
| 5,805,341 A | * | 9/1998 | Kuba | 359/630 |
| 5,850,231 A | * | 12/1998 | Orimoto et al. | 345/533 |
| 6,266,711 B1 | * | 7/2001 | Ishikawa et al. | 710/8 |
| 6,542,771 B2 | * | 4/2003 | Saotome et al. | 600/425 |
| 7,865,236 B2 | * | 1/2011 | Cory et al. | 600/547 |
| 8,036,439 B2 | * | 10/2011 | Moriya | 382/128 |
| 8,111,947 B2 | * | 2/2012 | Sato et al. | 382/294 |
| 8,135,199 B2 | * | 3/2012 | Russakoff | 382/132 |

(Continued)

FOREIGN PATENT DOCUMENTS

| | | |
|---|---|---|
| EP | 2196137 A1 * | 6/2010 |
| JP | 2007209531 A * | 8/2007 |

(Continued)

OTHER PUBLICATIONS

Carter et al., "Biomechanical Model Initialized Non-Rigid Registration for Image-Guided Breast Surgery," Computational Biomechanics for Medicine, 9th MICCAI Conference Workshop, Oct. 1, 2006, pp. 104-112 (9 pages).

(Continued)

*Primary Examiner* — Jayesh A Patel
*Assistant Examiner* — Iman K Kholdebarin
(74) *Attorney, Agent, or Firm* — Canon USA Inc. IP Division

(57) ABSTRACT

An information processing apparatus and an information processing method including a deformation shape model generation unit configured to generate, from information about a first shape and a first position of a feature region in a target object under a first deformation condition, a deformation of the first shape with the position of the feature region as a reference as a model, and a deformation estimation unit configured to, based on information about a second shape and a second position corresponding to the feature region in the target object under the second deformation condition, align the first position with the second position to estimate deformation from the first shape to the second shape using the model.

12 Claims, 7 Drawing Sheets

(56) References Cited

U.S. PATENT DOCUMENTS

| | | | |
|---|---|---|---|
| 8,165,372 B2* | 4/2012 | Ishikawa et al. | 382/128 |
| 2003/0206171 A1* | 11/2003 | Kim et al. | 345/473 |
| 2003/0216648 A1* | 11/2003 | Lizzi et al. | 600/439 |
| 2004/0094167 A1* | 5/2004 | Brady et al. | 128/916 |
| 2004/0254460 A1* | 12/2004 | Burcher et al. | 600/437 |
| 2005/0089205 A1* | 4/2005 | Kapur et al. | 382/128 |
| 2005/0096515 A1* | 5/2005 | Geng | 600/315 |
| 2005/0251029 A1* | 11/2005 | Khamene et al. | 600/427 |
| 2007/0239004 A1* | 10/2007 | Kakee et al. | 600/437 |
| 2008/0143724 A1* | 6/2008 | Russakoff | 345/441 |
| 2008/0144939 A1* | 6/2008 | Russakoff | 382/190 |
| 2008/0292214 A1* | 11/2008 | Vomweg et al. | 382/294 |
| 2009/0005680 A1* | 1/2009 | Jones et al. | 600/437 |
| 2009/0080692 A1* | 3/2009 | Moriya | 382/100 |
| 2009/0129650 A1* | 5/2009 | Hawkes et al. | 382/131 |
| 2009/0175518 A1* | 7/2009 | Ikuma et al. | 382/128 |
| 2009/0264758 A1* | 10/2009 | Fujita et al. | 600/443 |
| 2009/0285460 A1* | 11/2009 | Ishikawa et al. | 382/128 |
| 2010/0074488 A1* | 3/2010 | Ishikawa et al. | 382/128 |
| 2010/0135544 A1* | 6/2010 | Mattiuzzi et al. | 382/128 |
| 2010/0220905 A1* | 9/2010 | Katsuhara | 382/128 |
| 2010/0256459 A1* | 10/2010 | Miyasa et al. | 600/300 |
| 2010/0256991 A1* | 10/2010 | Ishikawa et al. | 705/3 |
| 2011/0082383 A1* | 4/2011 | Cory et al. | 600/547 |
| 2011/0142308 A1* | 6/2011 | Ishikawa et al. | 382/128 |
| 2011/0213748 A1* | 9/2011 | Kawagishi et al. | 706/52 |
| 2011/0216958 A1* | 9/2011 | Satoh et al. | 382/131 |
| 2011/0246129 A1* | 10/2011 | Ishikawa et al. | 702/150 |
| 2011/0246410 A1* | 10/2011 | Iizuka et al. | 706/52 |
| 2011/0262015 A1* | 10/2011 | Ishikawa et al. | 382/128 |
| 2012/0007863 A1* | 1/2012 | Endo et al. | 345/419 |
| 2012/0065505 A1* | 3/2012 | Jeong et al. | 600/438 |
| 2012/0134568 A1* | 5/2012 | Russakoff | 382/132 |
| 2012/0207368 A1* | 8/2012 | Ishikawa et al. | 382/128 |
| 2012/0253173 A1* | 10/2012 | Endo et al. | 600/411 |
| 2012/0321161 A1* | 12/2012 | Ishikawa et al. | 382/131 |

FOREIGN PATENT DOCUMENTS

| | | | |
|---|---|---|---|
| JP | 2008086400 A | * | 4/2008 |
| WO | WO 2009028354 A1 | * | 3/2009 |
| WO | WO 2010058854 A1 | * | 5/2010 |
| WO | WO 2010113633 A1 | * | 10/2010 |

OTHER PUBLICATIONS

Hu et al., "A Statistical Motion Model Based on Biomechanical Simulations for Data Fusion during Image-guided Prostate Interventions," Proc. MICCAI 2008, Part I, LNCS 5241, pp. 737-744 (8 pages), 2008.

* cited by examiner

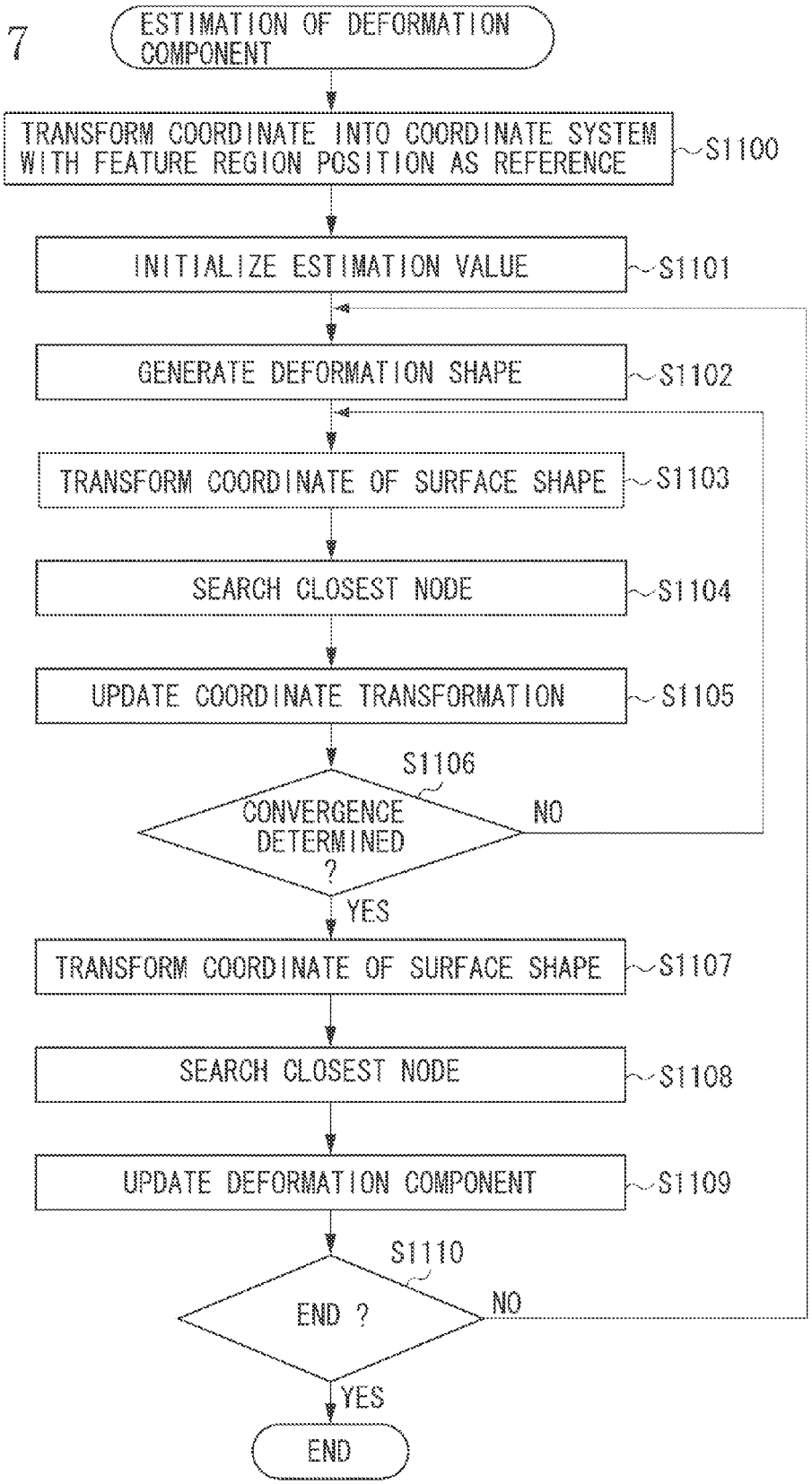

INFORMATION PROCESSING APPARATUS, INFORMATION PROCESSING METHOD, AND STORAGE MEDIUM

BACKGROUND OF THE INVENTION

1. Field of the Invention

The present invention relates to an information processing apparatus for deforming a shape and, in particular, to an information processing apparatus for deforming the image of an object to agree with a shape as a target.

2. Description of the Related Art

In the medical field, a medical practitioner (doctor or the like) displays a captured medical image of a patient on a monitor and observes the state and the aging of a lesioned part by interpreting the displayed medical image. Apparatus for generating such a medical image include a roentgenographic apparatus, an X-ray computer tomographic apparatus (X-ray CT), a magnetic resonance imaging apparatus (MRI), a nuclear medicine diagnostic apparatus (e.g., single photon emission computed tomography (SPECT) and positron-emission tomography (PET)), and an ultrasound imaging diagnostic apparatus (US).

When examining a mammary gland, for example, imaging diagnosis can be performed in such a procedure that the position of a lesioned part in a breast is identified on an image captured with an MRI, and then the state of the region is observed using an ultrasound imaging diagnostic apparatus.

In a general imaging protocol at a mammary gland department, in most cases an MRI imaging is performed in the prone position, and an ultrasound imaging is performed in the supine position. At this point, a doctor estimates the position of the lesioned part in the supine position from that of the lesioned part acquired by the MRI image in the prone position in consideration of the deformation of a breast caused by difference in an imaging position.

A very large deformation of the breast caused by difference in an imaging position deviates the position of the lesioned part estimated by the doctor from an actual lesioned part. That causes a problem that the ultrasound image of the lesioned part that is desired to be essentially observed cannot be visualized or a long time is consumed for the search of the lesioned part.

If the MRI imaging is performed in the supine position in which the ultrasound imaging is performed, the problem can be solved, however, the imaging in the supine position is affected by the respiration of a subject to cause a new problem that a clear MRI image required for interpretation cannot be acquired.

If the MRI image virtually captured in the supine position can be generated by subjecting the MRI image captured in the prone position to deformation by image processing, the position of the lesioned part is identified from the deformed MRI image to allow the ultrasound imaging of the lesioned part without consideration of difference in an imaging position.

For example, after the MRI image captured in the prone position is interpreted to acquire the position of the lesioned part on the image, the position of the lesioned part on the virtual MRI image in the supine position can be calculated based on the deformation image from in the prone position to in the supine position. Alternatively, the generated virtual MRI image in the supine position is interpreted to enable directly acquiring the position of the lesioned part on the image.

This can be realized by the following method: T. J. Carter, C. Tanner, W. R. Crum and D. J. Hawkes, "Biomechanical model initialized non-rigid registration for image-guided breast surgery", 9th Computational Biomechanics for Medicine, 9th MICCAI Conference Workshop. Use of the above method can change the shape of the MRI image in the prone position similar to that of the MRI image in the supine position.

In this method, a virtual MRI image in the supine position is generated from an MRI image in the prone position based on a physical simulation. A deformation registration between the virtual MRI image in the supine position and the MRI image actually captured in the supine position is executed based on the similarity of a pixel value. A process for changing the shape of the MRI image in the prone position into the shape thereof similar to that of the MRI image in the supine position is executed based on the association relationship acquired by the above process.

The following publication discusses a technique for performing an association between the shapes before and after the shape is changed at a high-speed using a statistical motion model (hereinafter referred to as SMM): Y. Hu, D. Morgan, H. U. Ahmed, D. Pendse, M. Sahu, C. Allen, M. Emberton and D. Hawkes, "A statistical motion model based on biomechanical simulations", Proc. MICCAI 2008, Part I, LNCS 5241, pp. 737-744, 2008.

In the above technique, a deformation shape group is acquired in a case where various parameters related to the deformation of a target object (hereinafter referred to as a deformation parameter) are set by a physical simulation applied to shape data before deformation and the result is subjected to a principal component analysis to generate the SMM. The surface shape data after deformation separately acquired is compared with the shape of a surface part of the SMM to estimate deformation, performing an association between the shapes before and after deformation.

A correct value of the deformation parameter of the target object needs to be acquired in advance to properly act the process based on the method discussed by T. J. Carter and et al. In other words, this causes a problem that the method discussed by T. J. Carter and et al. cannot be applied if the deformation parameter is unknown.

If the deformation parameter is unknown, an approach may be taken in which deformations based on every pattern of the deformation parameter are experimentally performed. This, however, produces a problem that a significant amount of time is required for the experiment of a large number of deformations.

In the method discussed by Y. Hu and et al., deformation is estimated using only the contour shapes of a target object, so that the estimation becomes vague when a smoothly curved shape like a breast surface of the human body is subjected to estimation, and there is a problem that an accurate estimation of deformation cannot be realized.

SUMMARY OF THE INVENTION

The present invention is directed to an information processing apparatus and an information processing method capable of estimating deformation caused by the difference in deformation conditions at a high accuracy and at a high speed if deformation parameters of a target object are unknown.

According to an aspect of the present invention, an information processing apparatus includes a deformation shape model generation unit configured to generate, from information about a first shape and a first position of a feature region in a target object under a first deformation condition, the deformation of the first shape with the position of the feature region as a reference as a model and a deformation estimation unit configured to, based on information about a second shape and a second position corresponding to the feature region in the target object under the second deformation condition, align the first position with the second position to estimate deformation from the first shape to the second shape using the model.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 7 is a flow chart illustrating a processing sequence performed in step S209 according to the first exemplary embodiment.

DESCRIPTION OF THE EMBODIMENTS

Figure 1:
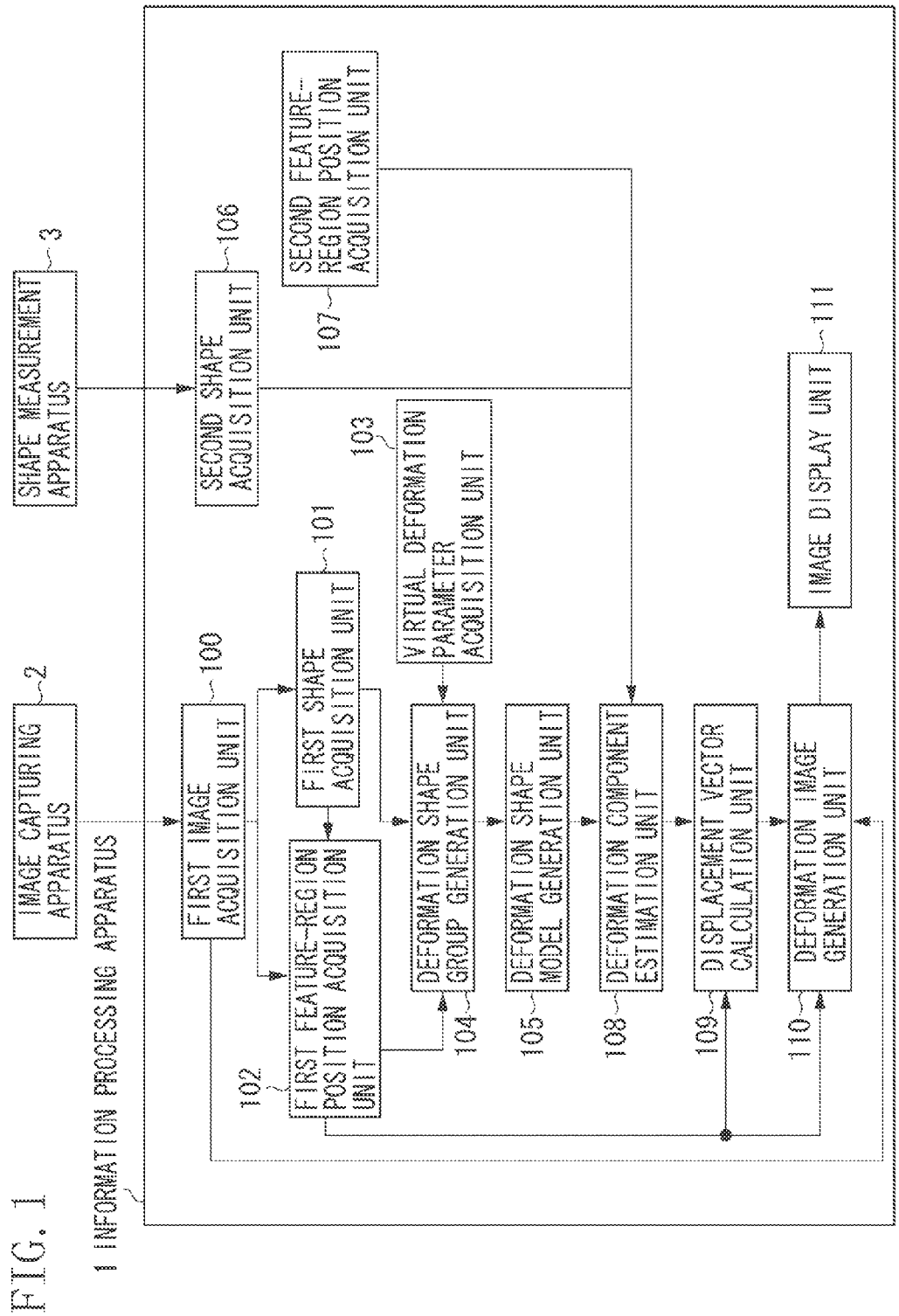
FIG. 1 is a block diagram illustrating a functional configuration of an information processing apparatus according to a first exemplary embodiment.

Various exemplary embodiments, features, and aspects of the invention will be described in detail below with reference to the drawings. However, it is to be understood that the scope of the invention is not limited to the examples illustrated in the drawings.

FIG. 1 illustrates a functional configuration of an information processing apparatus 1 according to the present exemplary embodiment. The information processing apparatus 1 according to the present exemplary embodiment is connected to an MRI apparatus as an image capturing apparatus 2 and a laser range sensor as a shape measurement apparatus 3.

The information processing apparatus 1 acquires first three-dimensional image data obtained by the image capturing apparatus 2 that captures an image of a target object under a first deformation condition. The information processing apparatus 1 also acquires information indicative of a surface shape of the target object (hereinafter referred to as a second surface shape) obtained by the shape measurement apparatus 3 that measures the target object under a second deformation condition.

The information processing apparatus 1 then generates and displays a deformation image in which the first three-dimensional image is deformed so that the shape of the target object captured on the first three-dimensional image (hereinafter referred to as a first shape) approximately agrees with the shape of the target object under the second deformation condition (the second shape).

The information processing apparatus 1 includes the components illustrated in FIG. 1 configured to perform the functions further described below.

A first image acquisition unit 100 acquires the first three-dimensional image (an original image) in which the image capturing apparatus 2 captures an image of the target object under the first deformation condition, and transmits the first three-dimensional image to a first shape acquisition unit 101, a first feature-region position acquisition unit 102, and a deformation image generation unit 110.

The first shape acquisition unit 101 processes the first three-dimensional image acquired by the first image acquisition unit 100 to extract information about the shape of the target object under the first deformation condition (the first shape), and generates a shape model describing the first shape (hereinafter referred to as a first shape model). The first shape acquisition unit 101 transmits the generated first shape model to the first feature-region position acquisition unit 102.

The first feature-region position acquisition unit 102 processes the first three-dimensional image acquired by the first image acquisition unit 100 to extract a single predetermined feature region related to the target object under the first deformation condition, and executes a process for incorporating a first position information about the position (hereinafter referred to as a first position) into the first shape model. The first feature-region position acquisition unit 102 transmits the first shape model to which information about feature region is added to a deformation shape group generation unit 104, a displacement vector calculation unit 109, and the deformation image generation unit 110.

A virtual deformation parameter acquisition unit 103 acquires $n_p$ sets of virtual deformation parameters, in a method described below, in which a possible value of a deformation parameter of the target object is virtually set, and transmits the virtual deformation parameters to the deformation shape group generation unit 104. The deformation parameter of the target object refers to material' strength physical quantity (elastic coefficient, for example) defining a character related to the deformation of the target object and information about external force acting on the target object under the first and second deformation conditions.

The deformation shape group generation unit 104 performs a physical simulation on the first shape model based on each of a plurality of virtual deformation parameters received from the virtual deformation parameter acquisition unit 103. The deformation shape group generation unit 104 generates a plurality of deformation shapes in which the first shape is deformed (hereinafter referred to as deformation shape group) to calculate the displacement of associated feature region positions.

The deformation shape group generation unit 104 transforms each of the plurality of deformation shapes into a coordinate system with the feature region position as a reference. More specifically, the deformation shape group generation unit 104 performs a coordinate transformation so that the feature region positions agree with one another among the deformation shapes, and transmits these pieces of information to a deformation shape model generation unit 105.

The deformation shape model generation unit 105 generates a deformation shape model capable of approximately representing various possible deformation shapes of the target object under the second deformation condition based on the deformation shape group, and transmits the deformation shape model to a deformation component estimation unit 108.

A second shape acquisition unit 106 acquires information about a surface shape of the target object under the second deformation condition (the second surface shape) as information about apart of the second shape of the target object from the shape measurement apparatus 3. In the present exemplary embodiment, range data composed of sets of three-dimensional coordinates representing the positions of point group densely arranged on the surface of the object are supplied from the shape measurement apparatus 3 as the surface shape of the target object.

A second feature-region position acquisition unit 107 extracts the position of feature region of the target object (a second position) based on the second surface shape (range data) acquired by the second shape acquisition unit 106, and transmits the second position information to the displacement vector calculation unit 109.

The deformation component estimation unit 108 calculates a deformation component estimation value for describing the second shape using the deformation shape model based on the second surface shape acquired by the second shape acquisition unit 106 and the second position extracted by the second feature-region position acquisition unit 107. The deformation component estimation unit 108 transmits the estimation value to the displacement vector calculation unit 109.

The displacement vector calculation unit 109 calculates a displacement vector for deforming the first shape model to the second shape based on the deformation component estimation value and transmits the displacement vector to the deformation image generation unit 110.

The deformation image generation unit 110 generates a second three-dimensional image in which the first three-dimensional image is deformed to the second shape (a deformation image) based on the first shape model and the displacement vector, and transmits the second three-dimensional image to an image display unit 111.

The image display unit 111 displays the second three-dimensional image.

Figure 2:
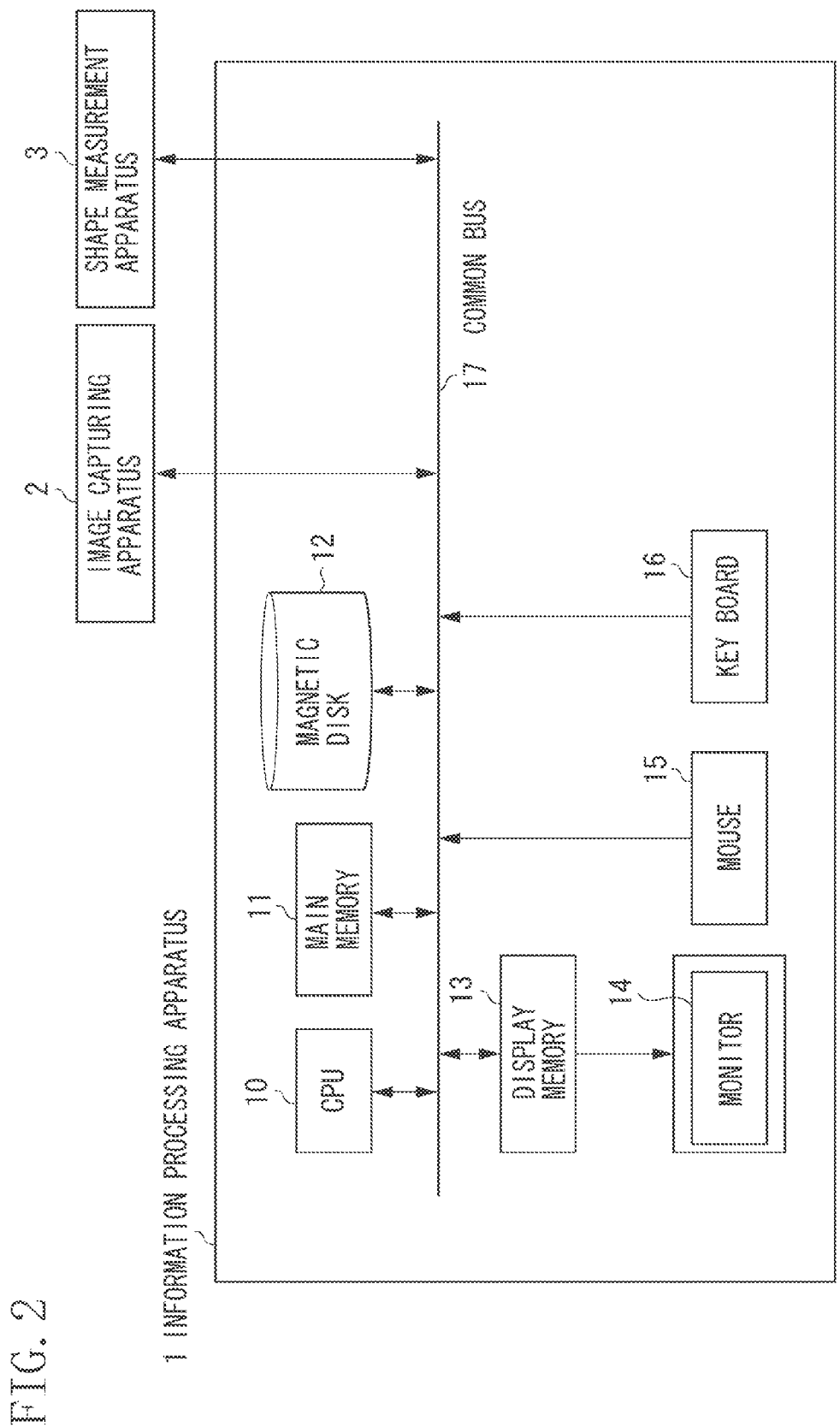
FIG. 2 is a block diagram illustrating a configuration of the information processing apparatus according to the first exemplary embodiment.

FIG. 2 illustrates a configuration of the information processing apparatus according to the first exemplary embodiment and the apparatus connected thereto. The information processing apparatus 1 can be realized by a personal computer (PC), for example, and includes a central processing unit (CPU) 10, a main memory 11, a magnetic disk 12, a display memory 13, a monitor 14, a mouse 15, and a key board 16.

The CPU 10 mainly controls the operation of each component of the information processing apparatus 1. The main memory 11 stores a control program executed by the CPU 10 and provides a work area required when the CPU 10 executes the program. The magnetic disk 12 stores an operating system (OS), device drivers of a peripherals, and various application software including a program for performing a deformation estimation process described later.

The display memory 13 temporarily stores display data for the monitor 14. The monitor 14 is a CRT monitor or a liquid crystal monitor, for example, and displays an image based on data from the display memory 13. The mouse 15 and the keyboard 16 perform a pointing input and a character input by the user respectively. The above-mentioned components are communicably connected to one another via a common bus 17.

The information processing apparatus 1 is connected to the shape measurement apparatus 3 via a local area network (LAN) such as an Ethernet (registered trade mark), and can acquire the surface shape of the target object from the shape measurement apparatus 3. Furthermore, the information processing apparatus 1 is connected to the image capturing apparatus 2 via the local area network (LAN) such as an Ethernet (registered trade mark), and can acquire image data from the image capturing apparatus 2.

The exemplary embodiment of the present invention is not limited to the above connection. The information processing apparatus 1 may be connected to those apparatus via other interfaces such as USB or IEEE1394, for example. The information processing apparatus 1 may read required data from a data server managing those data via a LAN.

The information processing apparatus 1 is connected to a storage apparatus such as an FDD, a CD-RW drive, an MO drive, or a ZIP drive, for example, and may read required data from these drives.

The information processing apparatus 1 according to the present exemplary embodiment estimates deformation from the shape of the target object under the first deformation condition to the shape of the target object under the second deformation condition, deforms the first three-dimensional image based on the above estimation, and displays the deformed image. More specifically, this processing corresponds to the processing subjecting the first three-dimensional image to a deformation process to virtually generate and display the first three-dimensional image under the second deformation condition.

In the present exemplary embodiment, an example with the breast of the human body as a target object is described. The first deformation condition in the present exemplary embodiment is defined as the state in which the breast is in the prone position with respect to the direction of gravity. The second deformation condition is defined as the state in which the breast is in the supine position with respect to the direction of gravity. In other words, the direction of gravity acting on the breast is different between the first and second deformation conditions.

Since the conditions are different from each other, a deformation is produced between shapes obtained under the first and second conditions. The information processing apparatus 1 according to the present exemplary embodiment executes deformation registration based on difference in the direction of gravity acting on the target object and the elastic coefficient of the target object (Young's modulus and Poisson's ratio) in each of the first and second deformation conditions as unknown deformation parameters.

A process executed by the information processing apparatus 1 according to the present exemplary embodiment is described below in detail with reference to a flow chart illustrated in FIG. 3.

Figure 4B:
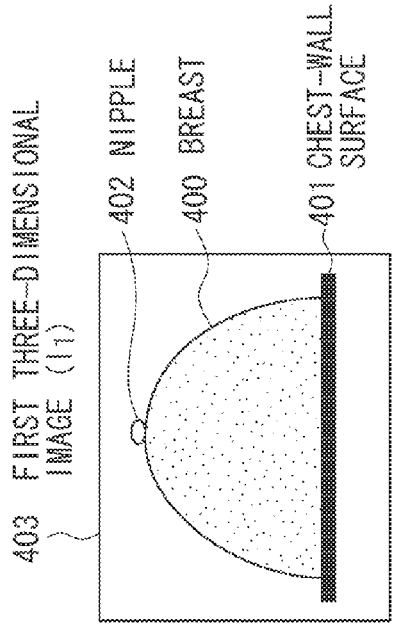
FIGS. 4A to 4D illustrate a target object and an acquisition of shape of the target object according to the first exemplary embodiment.
Figure 4D:
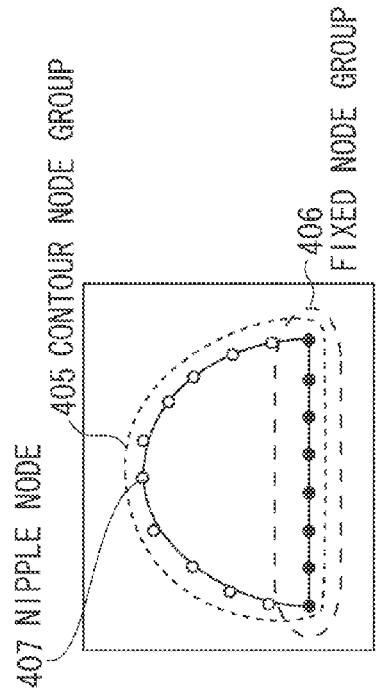
Figure 4A:
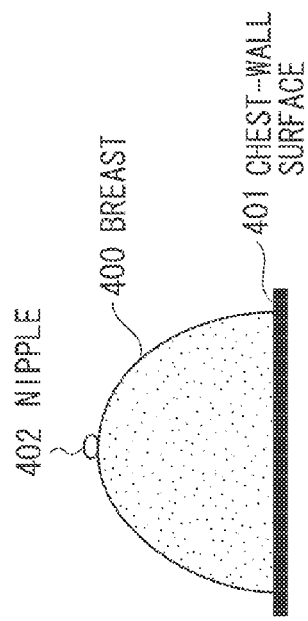

In the following description, an example is used in which a breast 400 physically formed on a non-deformed chest-wall surface 401 is imaged as illustrated in FIG. 4A. A nipple 402 is on the breast 400. In FIGS. 4A to 4D, for the convenience of illustration, the breast 400, the chest-wall surface 401 and nipple 402 are illustrated as if they are objects on the two dimensional plane. In reality, however, the breast 400, the chest-wall surface 401, and nipple 402 are in a three-dimensional shape. FIGS. 4A to 4D illustrate the cross-sections thereof.

In the present exemplary embodiment, Young's modulus and Poisson's ratio are scalar quantities indicated by $p_y$ and $p_p$, respectively. The difference in the gravitational acceleration is the three-dimensional vector quantity $P_g$ of the gravitational acceleration acting on the breast 400. The components thereof are taken as $P_{gx}$, $P_{gy}$, and $P_{gz}$. In other words, a deformation parameter p of the breast 400 in the present exemplary embodiment is denoted by a five-dimensional vector represented by Expression (1).

$$P=(P_y, P_p, P_{gx}, P_{gy}, P_{gz})^T \tag{1}$$

Figure 5:
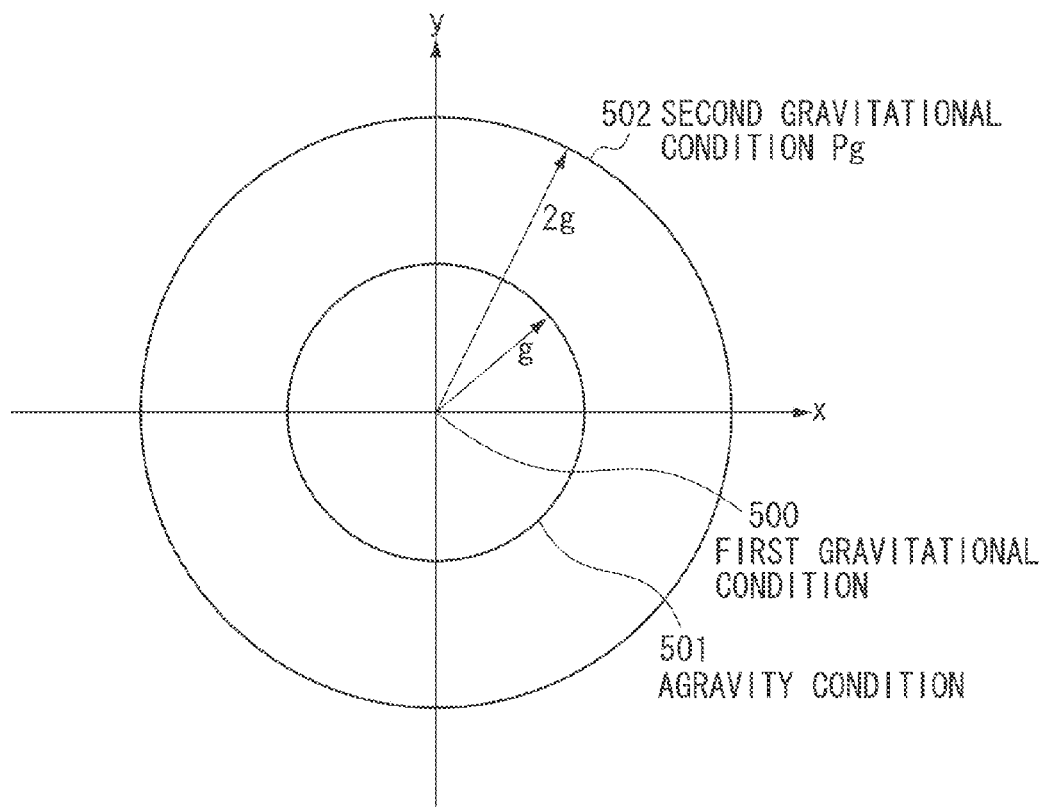
FIG. 5 is a diagram illustrating gravitational acceleration according to the first exemplary embodiment.

For the sake of a efficient description, the meaning of the difference in the gravitational acceleration $P_g$ is described in detail below with reference to FIG. 5. FIG. 5 is a vector diagram indicating a vector of force acting on any local area of the target object by the gravitational acceleration. For the convenience of illustration, although the two-dimensional vector diagram is used for description, the difference in the gravitational acceleration $P_g$ in the present exemplary embodiment is the three-dimensional vector, so that description using the figure is expanded to the three dimensions and applied.

In FIG. 5, a first gravitational condition 500 represents the vector of the gravitational acceleration acting on the target object under the first deformation condition. In FIG. 5, the first gravitational condition 500 is placed on the original point of the vector diagram. An agravity condition 501 and a second gravitational condition 502 described later are expressed as a relative vector to the first gravitational condition 500.

The agravity condition 501 shows a possible value of vector of the gravitational acceleration in an agravity state with the first gravitational condition 500 as a reference. The absolute value of the gravitational acceleration vector under the agravity condition 501 is uniquely determined as the magnitude of the gravitational acceleration on the earth.

The absolute value is taken as g. The direction of the vector thereof is indeterminate. Therefore, the possible value of vector of force in an agravity state is any point on the circle with a radius g centering around the first gravitational condition 500.

The second gravitational condition 502 represents a possible value of vector of the gravitational acceleration acting on the target object under the second deformation condition. The absolute value of vector of the gravitational acceleration acting on the target object under the second deformation condition is g similarly to the above with the agravity state as a reference. The direction of the vector thereof is indeterminate. If this is represented using the vector diagram with the agravity state as a reference, the vector of the gravitational acceleration acting on the target object under the second deformation condition can take a vector on the circle with a radius g centering around the agravity state.

As illustrated in FIG. 5, on the other hand, the vector of the gravitational acceleration acting on the target object under the second deformation condition with the first gravitational condition as a reference can take a vector on the circle with a radius g centering around any point of the circle of the agravity condition 501. For this reason, in FIG. 5, the second deformation condition can take a vector in the circle with a radius 2g centering around the first gravitational condition.

The three-dimensional vector quantity $P_g$ related to external force in the present exemplary embodiment can take any three-dimensional vector quantity with an absolute value of 2g or less.

Referring back to FIG. 3, in step S200, the first image acquisition unit 100 acquires an MRI image acquired by the image capturing apparatus 2 capturing an image of the breast 400 under the first deformation condition as the first three-dimensional image (an original image). FIG. 4B illustrates an example of the first three-dimensional image acquired by the first image acquisition unit 100. The information of a first three-dimensional image 403 is expressed by Expression (2) as a function of luminance of a captured image defined in the three-dimensional space in a capture range:

$$I_1(x,y,z). \quad (2)$$

Where, x, y, and z mean a position coordinate in the three-dimensional space in the capture range, and express a position translated by x (mm), y (mm), and z (mm) from the original point in an orthogonal coordinate system with the capturing apparatus or the captured image as a reference (hereinafter referred to as MRI coordinate system).

In step S201, the first shape acquisition unit 101 processes the first three-dimensional image 403 acquired in step S200 to generate the first shape model representing the shape of the breast 400 under the first deformation condition. The process is described below with reference to FIG. 4.

Figure 4C:
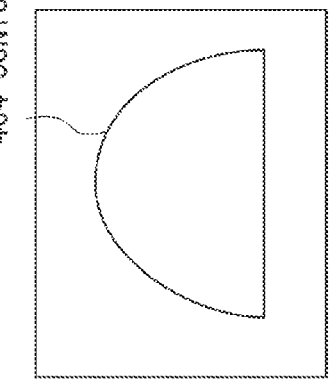

The first shape acquisition unit 101 subjects the first three-dimensional image 403 in FIG. 4B to a contour extraction process to acquire a contour shape 404 illustrated in FIG. 4C. The contour extraction process refers to a process for determining a contour being a boundary between the inside and the outside of the breast 400 in the first three-dimensional image 403.

More specifically, the contour shape 404 can be determined by a process in which a space gradient of luminance value of the first three-dimensional image 403 is calculated and subjected to a threshold process. In addition, the area of an image is divided based on difference in a histogram of the luminance value and a pattern of the luminance value between the inside and the outside of the breast 400 in the first three-dimensional image 403, and the boundary of the area may be determined as the contour shape 404.

The process for determining the contour shape 404 may be executed by any one or combination of the methods described above, or any method excluding the above methods.

The first shape acquisition unit 101 divides the contour shape 404 at an appropriate interval, and arranges a contour node group 405 illustrated in FIG. 4D. Each of the contour node group 405 has information about a three-dimensional position coordinate. Here, the contour node group 405 is composed of $m_1'$ contour nodes and their respective position coordinates are represented by a three-dimensional position coordinate vector $s_{1i}$ ($1 \le i \le m_1'$).

The first shape acquisition unit 101 takes a node group corresponding to a position where the breast 400 contacts the chest-wall surface 401 in the contour node group 405 as a fixed node group 406. For example, the first shape acquisition unit 101 detects and recognizes the area of the chest-wall surface 401 by the area division process, and determines the continuous node group out of the nodes in the vicinity of the area (the nodes in which a distance from the area is within a predetermined threshold value) as the fixed node group 406. The first shape acquisition unit 101 records necessary information so as to allow discrimination between the fixed node group 406 and other node groups (hereinafter referred to as surface node group).

The first shape acquisition unit 101 generates the first shape model using information about the contour node group 405 acquired by the above process. In the present exemplary embodiment, the first shape model is represented using a mesh model described below. A generation process for the mesh model performed by first shape acquisition unit 101 is described below with reference to FIG. 6.

Figure 6:
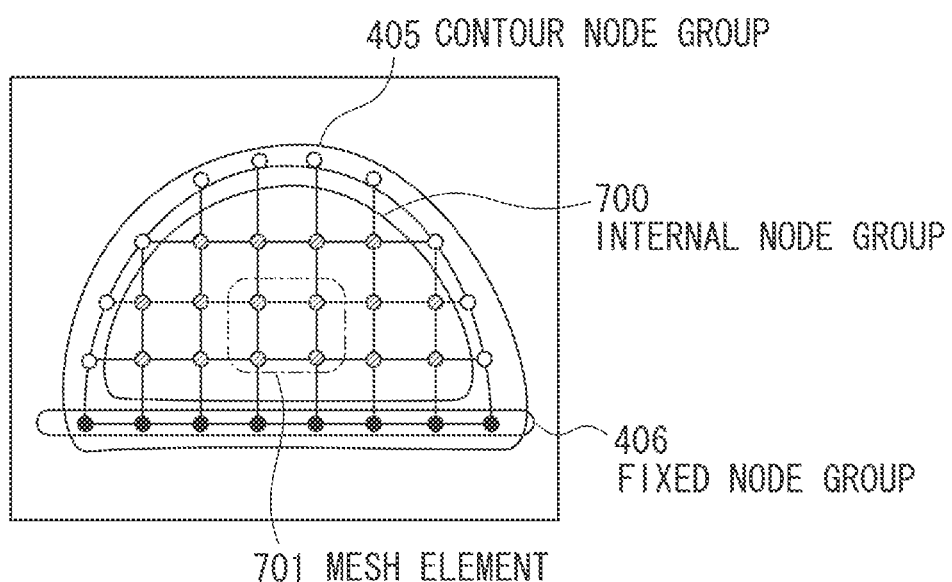
FIG. 6 is a diagram illustrating a mesh model according to the first exemplary embodiment.

In FIG. 6, the contour node group 405 and the fixed node group 406 are identical to those described in FIG. 4. The first shape acquisition unit 101 generates an internal node group 700 in the area encompassed by the contour node group 405. The internal node group 700 may be arranged in a division position where the area encompassed by the contour node group 405 is divided at equally spaced distances, for example. In the exemplary embodiment of the present invention, the internal node group 700 may be arranged using any method.

The first shape acquisition unit 101 generates information about the connection of the contour node group 405 to the fixed node group 406. The generation of information about the connection of the node groups can be realized by a method in which a Delaunay division is applied to the node groups.

Data representing information about the connection of the contour node group 405 to the fixed node group 406 generated by the above process are referred to as a mesh model. Data in which the position information of each node acquired above is provided for each node forming the mesh model (more specifically, data in which the mesh model is created so as to represent the shape of the breast 400 under the first deformation condition) is referred to as the first deformation model.

In the above description, each position coordinate of the generated internal node group 700 is represented by a three-dimensional position coordinate vector $s_{1i}$ ($m_1'+1 \leq i \leq m_1$) (where, $m_1$ is the total number of nodes of the mesh model). As expressed by Expression (3), the position information of the node group forming the first deformation model is represented by a $3 \times m_1$ dimensional vector in which the position coordinates of all nodes combining the contour node group 405 and the internal node group 700 are vertically arranged.

$$s_1 = \begin{pmatrix} s_{11}^T & s_{12}^T & \cdots & s_{1m_1}^T \end{pmatrix}^T = \begin{pmatrix} x_{11} \\ y_{11} \\ z_{11} \\ \vdots \\ z_{1m_1} \end{pmatrix} \quad (3)$$

The first deformation model generated by the above process is transmitted to each unit and used in subsequent processes.

In step S202, the first feature-region position acquisition unit 102 processes the first image 403 acquired in step S200, and extracts a predetermined feature region existing on the surface of the breast 400. It is preferable to use a nipple 402 as the feature region.

Alternatively, a plurality of markers (not illustrated in FIG. 4) which can be captured by the MRI is attached to the surface of a subject, and may be used as the feature region when the first image 403 is captured. In the following description, the coordinate value indicating the position of the feature region is represented by $v1=(x_1, y_1, z_1)$, and hereinafter referred to as a first position.

In step S202, the first feature-region position acquisition unit 102 executes a process for incorporating information about the first position acquired in the above process into the first shape model.

More specifically, the first feature-region position acquisition unit 102 searches for the node whose position is the closest to a feature region position $v_1$ from the surface node group composing the first shape model with respect to the first feature region, and sets the node as the node representing the feature region (hereinafter referred to as a feature region node). In other words, the first feature-region position acquisition unit 102 records an index n of the node as the feature region node representing the feature region and substitutes the position $s_{1n}$ with $v_1$. This is represented by the relationship expressed in Expression 4:

$$s_{1n} = v_1. \quad (4)$$

For example, if the nipple 402 illustrated in FIG. 4B is extracted, the node which is the closest to the position of the nipple 402 is set as a nipple node 407 (FIG. 4D). The position information of the nipple node 407 is substituted by the position of the nipple 402 extracted in this step.

In step S203, the virtual deformation parameter acquisition unit 103 acquires a plurality of virtual deformation parameters in which possible values of deformation parameters are virtually combined. In the present exemplary embodiment, the example is described in which $n_p$ virtual deformation parameters $p_k$ ($1 \leq k \leq n_p$) are acquired.

The virtual deformation parameters $p_k$ is generated in such a manner that the possible range of each component value of the deformation parameter is divided at an appropriate interval, and all the combinations thereof are acquired. At this point, division is finely adjusted according to the extent that each component affects the deformation of the target object.

For example, as for $p_y$ and $p_p$ out of the virtual deformation parameters $p_k$, the possible range is taken as $1000 < p_y < 4000$ [kPa] and $0 < p_p < 0.5$. As for $p_{gx}$, $p_{gy}$, and $p_{gz}$, the possible range is taken as a range satisfying $p_{gx}^2 + p_{gy}^2 + p_{gz}^2 \leq (2g)^2$. For example, $p_y$ greatly affects the deformation, so that the range is divided into 10 segments in units of 30 [kPa]. On the other hand, $p_p$ comparatively slightly affects the deformation, so that the range is divided into five segments in units of 0.1 [kPa]. As for $p_{gx}$, $p_{gy}$, and $p_{gz}$, the combination satisfying the condition related to the range out of combinations in which a range of $-2g$ to $+2g$ is divided into five segments is set.

In step S204, the deformation shape group generation unit 104 executes a process for generating a deformation shape group in which the first shape model is subjected to deformation based on each of a plurality of hypotheses (virtual deformation parameters) of the deformation parameter acquired in step S203. The process performed by the deformation shape group generation unit 104 can be realized by a physical simulation using a finite element method, for example.

Each of the virtual deformation parameters $p_k$ ($1 \leq k \leq n_p$) is assumed, and the first shape model is subjected to the physical simulation based on the finite element method, thereby calculating a displacement vector $d_{ki}$ ($1 \leq k \leq n_p$, $1 \leq i \leq m_1$) of each node composing the mesh model.

A calculation expressed by Expression (5) is executed to subject the position $s_{1i}$ ($1 \leq i \leq m_1$) of node of the first shape model to deformation based on the displacement vector $d_{ki}$ ($1 \leq k \leq n_p$, $1 \leq i \leq m_1$) of each node composing the mesh model. This calculates a position $s_{dki}$ ($1 \leq k \leq n_p$, $1 \leq i \leq m_1$) after the displacement of each node.

$$s_{dki} = s_{1i} + d_{ki} \quad (5)$$

As described in step S202, the node composing the mesh model includes the feature region node expressing the feature region. Performing the above process estimates also the position $v_{dk}$ ($= s_{dkn}$) after the displacement of the feature region in a case where each of the virtual deformation parameters $p_k$ ($1 \leq k \leq n_p$) is assumed.

Furthermore, a process for translating the position $s_{dki}$ acquired by Expression (5) is performed so that the coordinate value after the displacement of the feature region is moved to a predetermined reference point in the three-dimensional space to update all positions $s_{dki}$. In the present exemplary embodiment, a specific example is described below in which an original point is used as the predetermined reference point.

In this case, a process is executed in which the position of the feature region $s_{dkn}$, is subtracted from the position $s_{dki}$ of each node acquired by Expression (5). This subtraction process parallel translates all nodes by $-s_{dkn}$ to position the feature region node to the original point in all deformation shapes. More specifically, all deformation shapes are transformed into the coordinate system with the feature region position as a reference.

In the exemplary embodiment of the present invention, the original point does not necessarily need to be used as the predetermined reference point, but any point may be used as the reference point.

Finally, the $3 \times m_1$ dimensional vector $s_{dk}$, in which the position coordinates $s_{dki}$ ($1 \le i \le m_1$) of all nodes are vertically arranged with respect to each virtual deformation parameter $p_k$ ($1 \le k \le n_p$), is generated. A shape (or a deformation shape), into which the first shape may probably be deformed in a case where the virtual deformation parameter $p_k$ is assumed, is represented by the vector $s_{dk}$.

Performing the process in step S204 described above causes the deformation shape group generation unit 104 to generate such a deformation shape group $s_{dk}$ ($1 \le k \le n_p$) that the position of the feature region coincides at the original point. Although an exemplary embodiment is described above in which information about deformation shape is generated using the physical simulation based on the finite element method, the present exemplary embodiment is not limited to the above embodiment.

A physical simulation based on a difference method or a finite difference method, for example, is used to calculate the deformation shape of the target object. Furthermore, using a mesh-free method such as an MPS method allows the deformation shape to be calculated without the use of the mesh model. In the process in step S204, any method excluding the foregoing methods may be used so long as it can calculate the deformation shape based on each of the virtual deformation parameters.

In step S205, the deformation shape model generation unit 105 generates a deformation shape model approximately representing the deformation of the target object based on information $s_{dk}$ ($1 \le k \le n_p$) about a plurality of deformation shapes acquired in step S204.

Various methods may be used to generate the deformation shape model. For example, a statistical motion model (SMM) may be used which is discussed in Y. Hu and et al. According to the method, the deformation shape group $s_{dk}$ ($1 \le k \le n_p$) is subjected to a principal component analysis to extract a plurality of eigen-deformation components and the deformation of the target object can be approximately represented by the linear sum of the eigen-deformation components. A specific process using this method is described below.

An average shape $s_{d\_ave}$ is calculated from the information $s_{dk}$ ($1 \le k \le n_p$) about a plurality of deformation shapes acquired in step S204 by Expression (6):

$$s_{d\_ave} = \begin{pmatrix} s_{d1\_ave}^T & s_{d2\_ave}^T & \cdots & s_{dm_1\_ave}^T \end{pmatrix}^T \quad (6)$$

$$= \left( \left( \frac{1}{n_p} \sum_{k=1}^{n_p} s_{dk1} \right)^T \left( \frac{1}{n_p} \sum_{k=1}^{n_p} s_{dk2} \right)^T \cdots \left( \frac{1}{n_p} \sum_{k=1}^{n_p} s_{dkm_1} \right)^T \right)^T$$

$$= \frac{1}{n_p} \sum_{k=1}^{n_p} s_{dk}.$$

A normalized deformation shape group $s_{dk}'$ ($1 \le k \le n_p$) in which the average shape $s_{d\_ave}$ is subtracted from the information $s_{dk}$ ($1 \le k \le n_p$) is calculated. The variance-covariance matrix of the normalized deformation shape group $s_{dk}'$ ($1 \le k \le n_p$) is determined and an eigenvalue decomposition of the matrix is performed to obtain an eigenvalue $\lambda_i$ ($1 \le i \le n_e$) and an eigenvector $e_i$ ($1 \le i \le n_e$). Here, $n_e$ denotes the number of the eigenvectors to be calculated and is selected so that the accumulation contribution ratio of the eigenvalue exceeds a threshold value. Hereinafter, the eigenvector $e_i$ is referred to as an eigen-deformation component as needed.

As shown in Expression (7), the linear combination of $s_{d\_ave}$ and $e_i$ obtained by the above process allows the approximate representation of each deformation shape $s_{dk}$ ($1 \le k \le n_p$):

$$s_{dk} = s_{d\_ave} + s_{dk}' \cong s_{d\_ave} + \sum_{i=1}^{n_e} c_{ki} e_i \quad (7)$$

where, $c_{ki}$ ($1 \le i \le n_e$) is a coefficient of the linear combination for expressing the k-th deformation shape $s_{dk}$.

The average shape $s_{d\_ave}$ and the eigen-deformation component $e_i$ ($1 \le i \le n_e$) obtained by the above process are referred to as the deformation shape model of the breast 400. The deformation shape model is used to represent the shape $s_2$ of the breast 400 under the second deformation condition by the linear combination of $s_{d\_ave}$ and $e_i$. The value of a coefficient $c_i$ ($1 \le i \le n_e$) expressed by the following expression is adjusted to allow representing any shape $s_d$ into which the breast 400 may be deformed under the second deformation condition:

$$s_d = s_{d\_ave} + \sum_{i=1}^{n_e} c_i e_i. \quad (8)$$

As described in step S202, the node composing the mesh model includes the feature region node expressing the feature region. For this reason, the possible position $v_d$ ($=s_{dn}$) of the feature region on the breast 400 under the second deformation condition is also represented by the above linear combination.

As is clear from the contents of the process in step S204, all the positions of the feature region in the deformation shape group agree with the original point and not vary among the deformation shapes. Therefore, both of the values of elements in the average shape $s_{d\_ave}$ and the eigen-deformation component $e_i$ corresponding to the feature region become zero, always indicating the original point irrespective of the magnitude of the coefficient of the linear combination. In the following, the position coordinate of each node composing the shape $s_d$ is denoted by $s_{di}$ ($1 \le i \le m_1$) and the position coordinate of the feature region node is denoted by $v_d$ as needed.

In step S207, the second shape acquisition unit 106 executes a process for acquiring range data representing the surface shape of the breast 400 under the second deformation condition (the second surface shape) from the shape measurement apparatus 3 as information about a part of the second shape of the breast 400. The range data are composed of a set $s_{2j}$ ($1 \le j \le m_2$) of the three-dimensional coordinates representing a position in the coordinate system (hereinafter referred to as range sensor coordinate system) defined by the shape measurement apparatus 3.

In step S208, the second feature-region position acquisition unit 107 executes a process for acquiring the position of the feature region under the second deformation condition (the second position) with respect to the predetermined feature region related to the breast 400 acquiring the first position in step S202. The process is executed by extracting the region which is characteristic in shape such as a protruding portion from the second surface shape acquired in step S207, for example. In the following, the coordinate value indicating the second position is represented by $v_2 = (x_2, y_2, Z_2)$.

In step S209, the deformation component estimation unit 108 estimates such a set of coefficients of the linear combination ci ($1 \le i \le n_e$) that a shape representation using the deformation shape model (or $s_d$ in Expression 8) most appropriately represents the second shape $s_2$ of the breast 400. In other words, the second shape $s_2$ of the breast 400 is estimated by estimating the group of coefficients of the linear combination. The group of coefficients of the linear combination acquired in this step is represented by $n_e$-dimensional vector $c_{est}$ and hereinafter referred to as a deformation component estimation value.

The process is executed by the following procedure. A coordinate group $s_{2j}$ ($1 \le j \le m_2$) indicating the second surface shape is translated so that the second position v2 acquired in step S208 is positioned at the original point. Thereby, the feature region node represented by the deformation shape model generated in step S205 is caused to agree with the second position $v_2$.

The estimation value of rotation R centering about the feature region and the deformation component estimation value $c_{est}$ are optimized. The estimation value of rotation R means 3×3 matrix representing coordinate transformation by rotation. A specific process of the deformation component estimation unit 108 is described in detail below with reference to a flow chart illustrated in FIG. 7.

In step S1100, the deformation component estimation unit 108 transforms the coordinate group $s_{2j}$ ($1 \le j \le m_2$) indicating the second surface shape acquired in step S207 into the coordinate system with the feature region position as a reference. More specifically, the deformation component estimation unit 108 calculates a coordinate group $s_{2j}'$ ($1 \le j \le m_2$) in which the coordinate group $s_{2j}$ ($1 \le j \le m_2$) indicating the second surface shape is translated by a calculation shown by Expression (9) based on the second position $v_2$ acquired in step S208:

$$s_{2j}' = s_{2j} - v_2. \quad (9)$$

In step S1100, the deformation component estimation unit 108 initializes the deformation component estimation value $c_{est}$ and the estimation value of rotation R. In the initialization, $c_{est}$ can be taken as a zero vector and R can be taken as a unit vector.

In step S1101, the deformation component estimation unit 108 performs the calculation represented by Expression (10) based on the current deformation component estimation value $c_{est}$ to generate an estimation deformation shape $s_{d\_est}$:

$$s_{d\_est} = s_{d\_ave} + \sum_{i=1}^{n_e} c_{i\_est} e_i \quad (10)$$

where, $c_{i\_est}$ is the i-th component of the deformation component estimation value $c_{est}$.

The deformation component estimation unit 108 estimates the rotation R that makes the coordinate group $s_{2j}'$ ($1 \le j \le m_2$) acquired in step S1100 and the estimation deformation shape $s_{d\_est}$ acquired in step S1102 most matched to each other. The rotation R is updated by an interactive closest point (ICP) algorithm in a series of processes (steps S1103 to S1106) described below, for example.

In step S1103, the deformation component estimation unit 108 calculates a coordinate group $s_{2j\_rotate}$ ($1 \le j \le m_2$) in which the coordinate group $s_{2j}'$ ($1 \le j \le m_2$) acquired in step S1100 is subjected to rotation based on the current estimation value of the rotation R by Expression (11):

$$s_{2j\_rotate} = R s_{2j}'. \quad (11)$$

In step S1104, the deformation component estimation unit 108 searches for and selects the node that is the closest to each of the coordinate group $s_{2j\_rotate}$ ($1 \le j \le m_2$) acquired in step S1103 from the surface nodes composing the estimation deformation shape $s_{d\_est}$ acquired in step S1102. The selected node (hereinafter referred to as $s_{dj\_est}$ ($1 \le j \le m_2$)) is stored as a corresponding point of each of the coordinate group $s_{2j}'$ ($1 \le j \le m_2$).

In step S1105, the deformation component estimation unit 108 estimates the rotation R that makes the coordinate group $s_{2j}'$ ($1 \le j \le m_2$) and the estimation deformation shape $s_{d\_est}$ most matched to each other. More specifically, the deformation component estimation unit 108 calculates the rotation R that minimizes an evaluation value d using Expression (12) determining an average value of distances between the corresponding points of $s_{2j}'$ ($1 \le j \le m_2$) and $s_{dj\_est}'$ ($1 \le j \le m_2$) acquired in step S1104 as an evaluation function:

$$d = \frac{1}{m_2} \sum_{j=1}^{m_2} |s_{dj\_est}' - (R s_{2j}')|. \quad (12)$$

Since a method for determining a coordinate-system conversion using a plurality of corresponding points is known, a detailed description thereof is omitted herein.

In step S1106, the deformation component estimation unit 108 performs a convergence determination of a process for updating the rotation R. First of all, the deformation component estimation unit 108 calculates a difference Δd between the evaluation value d acquired in step S1105 and the evaluation value d calculated in step S1105 at the time of a previous repetitive operation, for example.

If the difference Δd is smaller than a predetermined threshold (YES in step S1106), the processing proceeds to step S1107. If the difference Δd is not smaller than the predetermined threshold (NO in step S1106), the processing returns to step S1103 to repeat the update of the rotation R. In other words, the processes from step S1103 to step S1105 are repetitively executed until the convergence determination becomes affirmative in step S1106.

The estimation value of the rotation R is updated by the above method. The subsequent processes are executed based on the updated rotation R.

In step S1107, the deformation component estimation unit 108 executes the process similar to that executed in step S1103. More specifically, the deformation component estimation unit 108 calculates the coordinate group $s_{2j\_rotate}$ ($1 \le j \le m_2$) in which the coordinate group $s_{2j}'$ ($1 \le j \le m_2$) is subjected to rotation based on the estimation value of the rotation R acquired in step S1106 by Expression 11.

In step S1108, the deformation component estimation unit 108 executes the process similar to that executed in step S1104. More specifically, the deformation component estimation unit 108 searches for the node that is the closest to each of the coordinate group $s_{2j\_rotate}$ ($1 \le j \le m_2$) acquired in step S1107 from the surface nodes composing the estimation deformation shape $s_{d\_est}$ to execute a process for associating $s_{2j}'$ ($1 \le j \le m_2$) with $s_{dj\_est}'$ ($1 \le j \le m_2$).

In step S1109, the deformation component estimation unit 108 executes a process for updating the deformation component estimation value $c_{est}$ to decease an error evaluation value d' between points associated with each other in step S1108. At this point, an average value of Euclidean distance between the associated points, for example, may be used as the error evaluation value d'. In this case, the error evaluation value d' can be determined by Expression (13):

$$d' = \frac{1}{m_2} \sum_{j=1}^{m_2} |s'_{dj\_est} - s_{2j\_rotate}|. \quad (13)$$

Aside from that, calculation may be performed in consideration of a normal direction to the contour surface of each shape, for example. The update process of $c_{est}$ can be executed by solving a generally known non-linear optimization problem.

For example, a greedy method can be used as a specific method for the above solution. In this case, a new coefficient in which an element of the current deformation component estimation value $c_{est}$ is slightly increased or decreased is generated to generate a deformation shape by the coefficient (using Expression (10)). The evaluation value d' in Expression (13) is calculated with respect to the deformation shape.

If the value is smaller than the error evaluation value d' based on the original deformation component estimation value $c_{est}$, the element of the deformation component estimation value $c_{est}$ is updated. Each element of the deformation component estimation value $c_{est}$ being independently subjected to the process allows updating the deformation component estimation value $c_{est}$ so that a distance between the corresponding points is reduced. Furthermore, the process is repetitively executed to determine nearly optimal $c_{est}$.

In addition to the above method, any of generally known non-linear optimization methods may be used. For example, a steepest descent method and a Newton method may be used.

The deformation component estimation value $c_{est}$ is updated by the above method. The subsequent processes are executed based on the updated deformation component estimation value $c_{est}$.

In step S1110, the deformation component estimation unit 108 determines whether the process in step S209 is ended. For example, to begin with, the deformation component estimation unit 108 calculates the evaluation value d' by Expression (13) based on the deformation component estimation value $c_{est}$ updated in step S1109. The process performed later is switched based on the evaluation value d'.

For example, if the evaluation value d' is smaller than the predetermined threshold (YES in step S1110), the present processing (or step S209) is ended. If the evaluation value d' is not smaller than the predetermined threshold (NO in step S1110), the processing returns to step S1102 to continue the process for updating the deformation component estimation value $c_{est}$. More specifically, the processes from step S1102 to step S1105 are repeated as long as the end determination is denied in step S1110.

The deformation component estimation unit 108 executes a process for calculating the estimation value of the rotation R centering about the feature region and the deformation component estimation value $c_{est}$ through the process in step S209 described above.

In step S210, the displacement vector calculation unit 109 performs a calculation represented by Expression (10) based on the deformation component estimation value $c_{est}$ calculated in step S209 to acquire the estimation value of the second shape $s_{2\_est}$ of the breast 400. The displacement vector calculation unit 109 calculates the displacement vector $d_i$ ($1 \leq i \leq m_1$) for deforming each node of the first shape model to the second shape using Expression (14):

$$d_i = R^{-1}[s_{2j\_est} - (s_{1j} - v_1)] + v_2. \quad \text{[Expression 14]}$$

Where, $s_{1j}$ indicates the three-dimensional position coordinate vector of the i-th node in the first shape model. $s_{2j\_est}$ is the three-dimensional position coordinate vector of the i-th node indicated by the estimation value of the second shape $s_{2\_est}$ and the 3(i−1)+1st, 3(i−1)+2nd, and 3(i−1)+3rd elements of $s_{2j\_est}$ correspond to $s_{2j\_est}$.

In step S211, the deformation image generation unit 110 deforms the first three-dimensional image acquired in step S200 to generate such a second three-dimensional image that the shape of the deformed breast 400 is similar to the second shape (a deformation image). The deformation is executed by a known image deformation method based on the first shape model generated in step S201 and the displacement vector $d_i$ ($1 \leq i \leq m_1$) of each node calculated in step S210.

In step S212, the image display unit 111 displays the second three-dimensional image generated in step S211 on the monitor 14.

As described above, according to the information processing apparatus 1 in the present exemplary embodiment, deformation is estimated based on the coordinate system with the feature-region position as a reference to allow a deformation parameter to be estimated by a simple calculation while ensuring that the feature region positions agree with one another. As a result, if the deformation parameter of the target object is unknown, an image deformed so as to substantially agree with the shape of the target object under the second deformation condition can be generated at a high speed and a high accuracy and displayed.

(Modification 1-1) <Model with Normalized Deformation Shape as a Basis Instead of SMM>

In the present exemplary embodiment, although the example is described in which the SMM is used as a process performed by the deformation shape model generation unit 105 in step S205, the exemplary embodiment of the present invention is not limited to the above example. For example, the normalized deformation shape group $s_{dk}'$ is used as the eigenvector $e_i$ as it is to allow the execution of the subsequent processes. The above method achieves the effect that a deformation shape model can be generated by a simpler process.

Any process may be used in the process in step S205 as well as the above method, provided that it generates a deformation shape model approximately representing the deformation of the target object based on information $s_{dk}$ ($1 \leq k \leq n_p$) about a plurality of deformation shape acquired in step S204.

(Modification 1-2) <3D Image at Both Inputs>

In the present exemplary embodiment, although the range sensor is used as the shape measurement apparatus 3, the image capturing apparatus 2 may be used as the shape measurement apparatus 3.

In this case, the target object is captured by the image capturing apparatus 2 under the second condition to acquire the three-dimensional image data (the second three-dimensional image data). The second shape acquisition unit 106 acquires the second three-dimensional image data from the image capturing apparatus 2, and extracts the surface shape of the target object (i.e., the coordinate group $s_{2j}$) from the image under the second deformation condition in step S207.

The second feature-region position acquisition unit 107 acquires the second position ((i.e., the coordinate value $v_2$) from the second three-dimensional image data in step S208 through the process similar to that performed in the first feature-region position acquisition unit 102.

In this case, the feature region of the target object may be inside the target object. A region with an anatomical feature or a tumor inside the object, for example, may be taken as a feature region. The first feature-region position acquisition unit 102 executes a process for extracting the feature region in the object in step S202.

For example, the region having such a feature that the first three-dimensional image 403 is higher in a luminance value than the periphery is extracted, and the position thereof is taken as a first position. The feature region node corresponding to the feature region inside the object is selected among the internal node group 406. The process of the second feature-region position acquisition unit 107 in step S208 is also similar to the above process.

The method allows aligning the three-dimensional images acquired under the first and second deformation conditions with each other. It is needless to say that other three-dimensional image capturing apparatus such as an MRI apparatus or an X-ray CT apparatus different from the image capturing apparatus 2 may be used as the shape measurement apparatus 3.

(Modification 1-3) <MRI/US Alignment>

An ultrasonic capturing apparatus with an ultrasonic probe to which a position sensor is attached may be used as the shape measurement apparatus 3 to align the MRI image captured under the first deformation condition with an ultrasonic image acquired under the second deformation condition.

If the feature region exists on the surface of the object, the second shape acquisition unit 106 acquires a set of positions of a probe leading-edge obtained by the operator operating an ultrasonic probe that is brought into contact with a subject as the surface shape of the object (the coordinate group $s_{2j}$) under the second deformation condition in the process step S207. The second shape acquisition unit 106 also acquires the position of a probe leading-edge obtained by the operator bringing the ultrasonic probe into contact with the feature region as the second position (the coordinate value $v_2$).

If the feature region exists inside the object, the second shape acquisition unit 106 acquires an ultrasonic image group captured by the operator operating an ultrasonic probe brought into contact with a subject and the positions of the probe at the time of capturing each ultrasonic image in the process step S207. The second shape acquisition unit 106 also acquires a set of positions of a probe leading-edge as the surface shape of the object (the coordinate group $s_{2j}$) under the second deformation condition.

The second feature-region position acquisition unit 107 extracts the feature region inside the object from the ultrasonic image group acquired in the step S207 in the process in step S208. The second feature-region position acquisition unit 107 calculates the three-dimensional position of the feature region in the coordinate system which the shape measurement apparatus 3 uses as a reference using the coordinate of the corresponding region on the ultrasonic image and the positions of the probe at the time of capturing the ultrasonic image, and determines the position as the second position (the coordinate value $v_2$).

(Modification 1-4) <Variation in Acquisition Method Of Feature Region>

In the present exemplary embodiment, although the second position is acquired using the range data of a subject measured by the shape measurement apparatus 3, the exemplary embodiment of the present invention is not limited to this configuration, provided that the second position can be acquired. For example, a pen-type instruction device (stylus) provided with a magnetic position sensor capable of measuring the position of a leading edge is brought into contact with the feature region such as a nipple or a marker to allow directly measuring the contact point as the second position.

In the present exemplary embodiment, although the example is described in which the first feature-region position acquisition unit 102 processes the first three-dimensional image to acquire the first position in step S202, the exemplary embodiment of the present invention is not limited to this configuration. The first position may be acquired based on the user's operation of the mouse 15 and the key board 16.

This allows omitting a process for extracting the feature region from the first three-dimensional image, achieving the effect that the present invention can be more surely executed without restriction on stability of image processing. In this case, it is desirable that the first feature-region position acquisition unit 102 displays the first three-dimensional image on the monitor 14 to present the image to the user, whereby the user can set information about the feature region on the image while viewing the image.

As is the case with the first feature-region position acquisition unit 102, the second feature-region position acquisition unit 107 may also acquire the second position based on the user's operation of the mouse 15 and the key board 16, which achieves the similar effect.

(Modification 1-5) <Method for Setting a Virtual Deformation Parameter>

The range and the number of divisions related to the virtual deformation parameter in the process in step S203 are merely specific exemplary embodiments, and the exemplary embodiment of the present invention is not limited to this configuration. The process in step S203 may be performed by any method, provided that it is capable of acquiring a virtual deformation parameter $p_k$ required for the processes at the rear stage.

For example, the process may be performed in such a manner that the user inputs the virtual deformation parameter $p_k$ via a user interface including the mouse 15 and the keyboard 16, and the virtual deformation parameter acquisition unit 103 acquires the virtual deformation parameter $p_k$.

In addition, the process may be differently performed in such a manner that the user inputs the range of each parameter and fineness of division thereof, and the virtual deformation parameter acquisition unit 103 automatically generates the value of the virtual deformation parameter $p_k$ according to the user's instructions. Alternatively, information about the virtual deformation parameter $p_k$ is previously stored in the magnetic disk 12, and the virtual deformation parameter acquisition unit 103 may acquire it from the magnetic disk 12.

(Modification 1-6) <Excluding the MRI>

In the present exemplary embodiment, although the example is described in which the MRI apparatus is used as the image capturing apparatus 2, the exemplary embodiment of the present invention is not limited to this configuration. For example, an X-ray CT apparatus, an ultrasound imaging diagnostic apparatus, a nuclear medical apparatus, and the like may be used.

In the first exemplary embodiment, a case is described in which a single feature region is extracted from the target object and the process is executed based thereon. In the second exemplary embodiment, on the other hand, a case is described in which a plurality of feature regions is extracted to execute the process at a high efficiency and a high accuracy.

In the present exemplary embodiment, the processes are partly modified in the first feature-region position acquisition unit 102, the deformation shape group generation unit 104, the second feature-region position acquisition unit 107, and the deformation component estimation unit 108 in the first exemplary embodiment. Other functions are similar in content to those in the first exemplary embodiment, so that the description thereof is omitted.

The information processing apparatus according to the present exemplary embodiment is similar in a functional configuration to the information processing apparatus 1 according to the first exemplary embodiment illustrated in FIG. 1.

Figure 3:
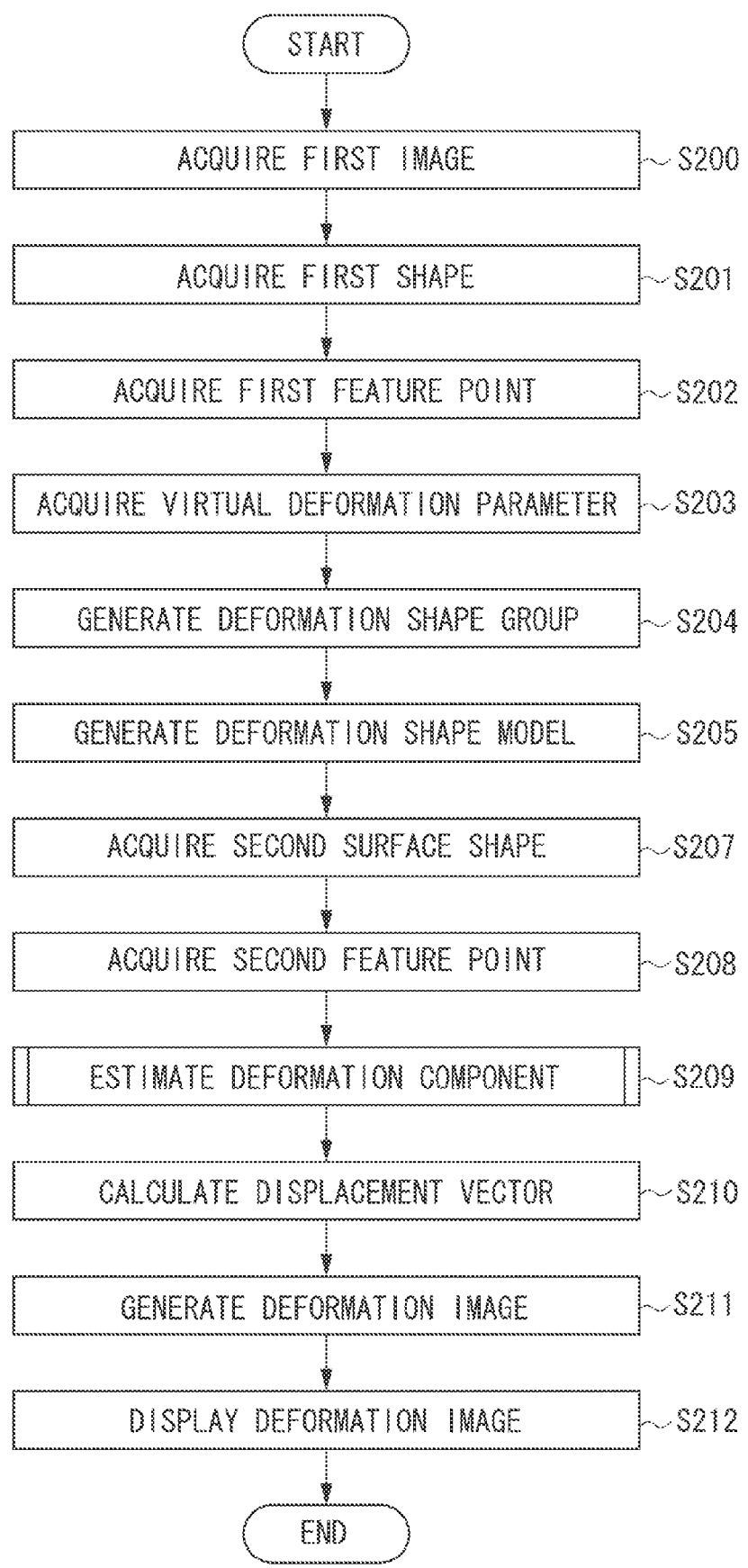
FIG. 3 is a flow chart illustrating a processing sequence of the information processing apparatus according to the first exemplary embodiment.

The entire process flow of the information processing apparatus according to the present exemplary embodiment is similar to that of the first exemplary embodiment described in FIG. 3. Since the present exemplary embodiment is partially different from the first exemplary embodiment in the processes executed in steps S202, S204, S208, and S209, the processes thereof are described in detail below. An example is described below in which two sets of feature regions are specifically used, i.e., both breasts captured by the MRI, for example, are target objects and the left and right nipples are used as feature regions.

In step S202, the first feature-region position acquisition unit 102 extracts a plurality of the feature regions (i.e., the left and right nipples) existing on the surface of the target object in the manner similar to that in the first exemplary embodiment, and executes a process for acquiring the positions thereof. Hereinafter, the coordinate value indicating the position of the acquired feature region is represented as $v_{1h}$ ($1 \leq h \leq 2$) and referred to as the first position.

The first feature-region position acquisition unit 102 executes a process for incorporating information about the first position acquired by the above process into the first shape model. Specifically, the first feature-region position acquisition unit 102 searches for the node whose position is the closest to a feature region position $v_{1h}$ ($1 \leq h \leq 2$) from the surface node group composing the first shape model with respect to each of the first feature regions, and sets the node as the node representing the feature region (hereinafter referred to as a feature region node). In other words, the first feature-region position acquisition unit 102 records an index $n_h$ ($1 \leq h \leq 2$) of the node as the feature region node representing the feature region, and substitutes the position $s_{1nh}$ with $v_{1h}$.

In step S204, the deformation shape group generation unit 104 subjects each of deformation shapes deformed by the physical simulation similar to that in the first exemplary embodiment, to a coordinate transformation into a coordinate system with two feature region positions (expressed as $s_{dkn1}$ and $s_{dkn2}$) after displacement as a reference. The coordinate system with two feature region positions after displacement as a reference refers to such a coordinate system that, for example, a midpoint s of the feature region (or $(s_{dkn1}+s_{dkn2})/2$) is taken as an original point, and a line connecting between the feature regions (a straight line 1 from $s_{dkn1}$ to $s_{dkn2}$) is defined as a space axis.

The coordinate transformation to the coordinate system is performed in such a manner that, for example, all the nodes are translated by $-s$ so that the midpoint s can meet the original point, and then all the nodes are subjected to rotation about an axis passing through the original point in orthogonal to the plane made by the line 1 and a predetermined space axis so that the line 1 can agree with the predetermined space axis.

In step S208, the second feature-region position acquisition unit 107 executes a process for acquiring the second position with respect to each of the feature regions. The coordinate value indicating the second position is represented as $v_{2h}$ ($1 \leq h \leq 2$).

The process in step S209 can be described with reference to FIG. 7 as is the case with the first exemplary embodiment. In FIG. 7, steps S1100, S1105, and S1109 are different in the processes from those in the first exemplary embodiment, so that differences are described below. Other processes are similar to those in the first exemplary embodiment, so that the description thereof is omitted.

In step S1100, the deformation component estimation unit 108 transforms the coordinate group $s_{2j}$ indicating the second surface shape acquired in step S207 into the coordinate system with the two second positions $v_{2h}$ acquired in step S208 as a reference. The coordinate transformation is a rigid-body transformation in which a translation t is performed so that the midpoint of a straight line connecting between the feature regions is moved to the original point, and then such a rotation R' that the straight line connecting between the feature regions agrees with the predetermined space axis is performed. The similar coordinate transformation is performed on each of the second position $v_{2h}$ to calculate the second position $v_{2h}'$ after the coordinate transformation.

In step S1103, the deformation component estimation unit 108 executes the process similar to that in the first exemplary embodiment to estimate the rotation R that makes the coordinate group $s_{2j}'$ and the estimation deformation shape $s_{d\_est}$ most matched to each other. The estimation of the rotation R is limited to the rotation component with the predetermined space axis (or the straight line connecting between the two feature regions) as a rotation axis.

In step S1109, the deformation component estimation unit 108 executes the process similar to that in the first exemplary embodiment. For the method for calculating the error evaluation value d', distance between the corresponding points of the feature regions (i.e., $\Sigma|v_{dh\_est} - R \cdot v_{2h}'|$) may be added with a predetermined weight to the error evaluation value d' that is the calculation result shown in Expression (13). Here, $v_{dh\_est}$ represents the position coordinate of each feature region in the estimation deformation shape $s_{d\_est}$ generated in step S1102.

According to the information processing apparatus 1 in the second exemplary embodiment described above, approximate agreement between two sets of feature regions can be taken as a constraint condition to produce an effect, whereby the process can be more efficiently executed in addition to the effect according to the first exemplary embodiment. Specifically, the search space of optimization process of the rotation R in step S209 in the first exemplary embodiment is three degrees of freedom. According to the present modification, on the other hand, an effect is produced that the search space can be limited to one degree of freedom.

(Modification 2-1) <Three Feature Regions>

In the present exemplary embodiment, although the example is described in which two sets of the feature regions are acquired, the exemplary embodiment of the present invention is not limited to this example. For example, a deformation shape model is generated in the coordinate system with three sets of the feature regions as a reference, thereby allowing the execution of a deformation alignment in the coordinate system with their feature regions as a reference in step S209.

In this case, in step S204, the deformation shape group generation unit 104 subjects each of deformation shapes deformed by the physical simulation to a coordinate transformation into the coordinate system with three feature region positions after displacement as a reference. The coordinate transformation is such a rigid-body transformation that, for example, all the feature regions are moved to a predetermined plane (e.g., an x-y plane), and one predetermined feature region among the feature regions are moved to a predetermined axis (e.g., an x axis) with the position of center of gravity of the feature region as the original point.

In step S1100, the deformation component estimation unit 108 transforms the coordinate group $s_{2j}$ indicating the second surface shape acquired in step S207 into the coordinate system with the three second positions acquired in step S208 as a reference.

The coordinate transformation is a rigid-body transformation in which a translation t is performed so that the position of center of gravity of the three feature regions is moved to the original point, and then such a rotation R' is performed so that the plane made by connecting the feature regions to each other agrees with the predetermined space plane and the predetermined feature region is positioned on the predetermined axis.

The estimation of the rotation R from steps S1103 to S1106 is not required and may be omitted.

According to the method described above, approximate agreement among three sets of feature regions can be taken as a constraint condition to produce an effect, whereby the process can be more efficiently executed in addition to the effect according to the second exemplary embodiment. Specifically, an effect can be achieved that the optimization process of the rotation R in step S209 in the first exemplary embodiment can be omitted.

(Modification 2-2) <Four or More Feature Regions>

In the present exemplary embodiment, the example is described in which two sets of the feature regions are used, and in modification 2-1, the example is described in which three sets of the feature regions are used, however, the exemplary embodiment of the present invention is not limited to the example. For example, a deformation shape model is generated in the coordinate system with four or more feature regions as a reference, and a deformation alignment may be executed in the coordinate system with those feature regions as a reference in step S209.

In this case, in step S204, the deformation shape group generation unit 104 subjects each of deformation shapes deformed by the physical simulation to a coordinate transformation into the coordinate system with four or more feature region positions after displacement as a reference. The coordinate transformation can be taken as a rigid-body transformation that, for example, the four or more feature region positions ($v_{1h}$) under the first deformation condition are taken as reference positions, and the position of each of the corresponding feature regions in the deformation shape provided with deformation is caused to approximately agree with each of the reference positions.

The minimization of the total sum of distances between the feature region positions under the first deformation condition and each of the corresponding feature regions in the deformation shape provided with deformation can be brought into the state of the approximate agreement. Furthermore, the minimization of the total sum of a difference between angles of the vector connecting the center of gravity of the reference position with each feature region can be brought into as the state of the approximate agreement.

In step S1100, the deformation component estimation unit 108 transforms the coordinate group $s_{2j}$ indicating the second surface shape acquired in step S207 into the coordinate system with the four or more second feature region positions acquired in step S208 as a reference. The coordinate transformation can be taken as a rigid-body transformation that, for example, the four or more feature region positions under the first deformation condition are taken as reference positions and the second position is caused to approximately agree with the reference position.

The estimation of the rotation R in step S1103 is not required, and may be omitted.

According to the method describe above, approximate agreement among four sets of feature regions can be taken as a constraint condition to produce an effect that the process can be more efficiently executed in addition to the effect according to the second exemplary embodiment. Specifically, an effect can be achieved that the optimization process of the rotation R in step S207 in the first exemplary embodiment can be omitted.

The above method can be executed in a case where not only four or more sets of feature regions are acquired, but also two and three sets of feature regions, for example, are acquired.

(Modification 2-3) <"Second Surface Shape" does not Need to be Used for a Plurality of Feature Regions>

In the present exemplary embodiment, although the example is described in which sets of feature regions are acquired, and the coordinate system with these feature region positions as references are used to align the second surface shape with the deformation shape model, the exemplary embodiment of the present invention is not limited to the above example. For example, in the present exemplary embodiment, only the second position may be used to allow aligning the second surface shape with the deformation shape model.

In this case, the processes in steps S1103 to S1108 may be omitted. In step S1109, a deformation component estimation value can be updated based on the sum of distances between the corresponding points of feature regions without using the second surface shape. In step S1110, the end determination of the repetition process can be performed based only on the sum of the distances.

According to the method described above, in the exemplary embodiment of the present invention in which sets of a plurality of feature regions are acquired, an effect can be achieved that the process for calculating a deformation component estimation value can be simply executed at a high efficiency and high speed.

(Modification 2-4) <One to Four or More Feature Regions>

In the present exemplary embodiment, the modifications 2-1 to 2-3, and the first exemplary embodiment, although the examples of preferable processing methods according to the predetermined number of sets of feature regions are described, the exemplary embodiment of the present invention is not limited to any of the above examples.

For example, such a mechanism may be provided that the number of sets of feature regions acquired in steps S202 and S208 can be switched by the instructions of the user and the process can be switched according to the number, and executed. Thereby, a preferable processing method is selected based on the acquired number of sets of feature regions, and can be executed, which produces an effect that user's convenience is improved.

It is to be understood that the object of the present invention can be achieved by supplying a recording medium (or a storage medium) recording a program code of software realizing the function of the exemplary embodiments to a system or an apparatus and by the computer (or a CPU and an MPU) of the system or the apparatus reading and executing the program code stored in the recording medium. In this case, the program code itself read from the recording medium realizes the function of the forgoing exemplary embodiments and the recording medium storing the program code constitutes the present invention.

It should be understood that the present invention includes the case where the execution of the program code read by the computer realizes the function of the aforementioned exemplary embodiments and furthermore an operating system (OS) operating on the computer performs a part or all of an actual process based on the instructions of the program code to cause the process to realize the function of the aforementioned exemplary embodiments.

It also should be understood that the present invention includes the case where the program code read from the recording medium is written in a function expansion card inserted into the computer or a memory included in a function expansion unit connected to the computer, then a CPU included in the function expansion card and the function expansion unit performs a part or all of an actual process based on the instructions of the program code and the function of the aforementioned exemplary embodiment is realized by the process.

If the present invention is applied to the above recording medium, the program code corresponding to the previously described flow chart is stored in the recording medium.

The description in the present exemplary embodiment mentioned above is an example of a preferable information processing apparatus according to the present invention, and the present invention is not limited to the above description.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-281001 filed Dec. 10, 2009, which is hereby incorporated by reference herein in its entirety.

What is claimed is:

1. An information processing apparatus including a central processing unit (CPU) comprising:
an image acquisition unit configured to acquire a first image of a target object under a first imaging condition;
a model generation unit configured to generate, based on the first image, a deformation model of a first shape of the target object under a plurality of deformation conditions, the deformation model representing a plurality of deformed shapes of the target object in which a position of a feature region in each of the deformed shapes coincides with each other;
a deformation estimation unit configured to calculate an estimated deformation value of the deformation model of first shape under a second imaging condition which is different from the first imaging condition;
a displacement vector calculation unit configured to calculate a displacement vector for displacing the first shape in accordance with the estimated deformation value; and
a deformation image generation unit configured to, based on the displacement vector, deform the first image to generate a deformed image which corresponds to a second shape of the target object,
wherein the deformation estimation unit calculates the estimated deformation value such that the position of the feature region represented by the deformation model and a position of the feature region in the second shape agree with each other, and
wherein the CPU controls an operation of at least one of the image acquisition unit, the model generation unit, the deformation estimation unit, the displacement vector calculation unit and the deformation image generation unit.

2. The information processing apparatus according to claim 1, wherein, in the deformation unit, if there are two feature regions, midpoints of straight lines connecting between the positions of the two feature regions are made to agree with each other, and the second shape is subjected to rotation to align the position of the feature region in the first shape under the first imaging condition with the position of the feature region in the second shape.

3. The information processing apparatus according to claim 1, wherein, in the model generation unit, if there are three feature regions in each of the deformed shapes, centers of gravity of the three feature regions are made to agree with each other, and a rigid-body transformation is applied to the second shape to align the positions of the feature regions in the deformed shapes with the position of the feature region in the second shape.

4. The information processing apparatus according to claim 1, wherein the first shape includes a plurality of feature regions, and
wherein, in the model generation unit, the deformation model includes a deformation of positions of the plurality of feature regions.

5. The information processing apparatus according to claim 1, wherein the first shape of the target object is a shape of a breast of a human body, and the feature region of the first shape includes at least a nipple of the breast.

6. The information processing apparatus according to claim 1, wherein the first shape of the target object is acquired from the first image which is captured by an MRI (magnetic resonance imaging) device, and the second shape is acquired from a surface shape of a deformed first shape.

7. An information processing method comprising:
acquiring a first image of a target object under a first imaging condition;
generating, based on the first image, a deformation model of a first shape of the target object under a plurality of deformation conditions, the deformation model representing a plurality of deformed shapes of the target object in which a position of a feature region in each of the deformed shapes coincides with each other;
calculating an estimated deformation value of the deformation model of the first shape under a second imaging condition which is different from the first imaging condition;
calculating a displacement vector for displacing the first shape in accordance with the estimated deformation value; and
deforming, based on the displacement vector, the first image to generate a deformed image which corresponds to a second shape of the target object,
wherein the deformation estimation step includes calculating the estimated deformation value such that the position of the feature region represented by the deformation model and a position of the feature region in the second shape agree with each other.

8. A non-transitory computer-readable storage medium storing a program for causing a computer to execute the information processing method according to claim 7.

9. The information processing apparatus according to claim 1, wherein, in a case where there are plural feature regions in each of the deformed shapes, points based on positions of the plural feature regions conform to one another.

10. The information processing apparatus according to claim 1, wherein the first shape of the target object is a shape of a breast of a human body, and
wherein the feature region of the first shape includes an anatomical feature inside the breast.

11. The information processing apparatus according to claim 1, wherein the first image includes a three-dimensional image of the target object, and
wherein at least one of the first shape and the second shape includes a cross-sectional image of the three-dimensional image.

12. The information processing apparatus according to claim 1, wherein the plurality of deformation conditions include at least one of a gravitational force acting upon the target object and an elastic coefficient of the target object.

* * * * *